March 15, 1949.    R. PONTING    2,464,654
CONTROLLING APPARATUS FOR POSITIONING GUNS
Filed March 20, 1943    3 Sheets-Sheet 2
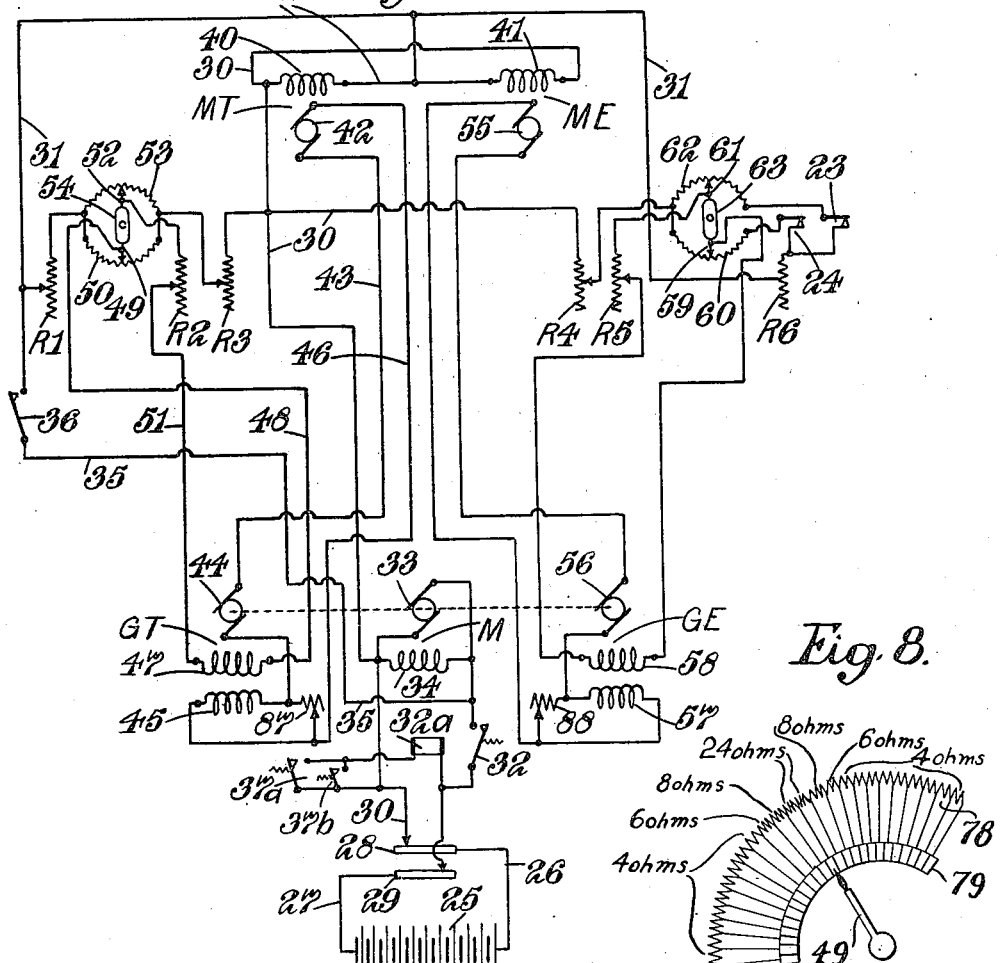
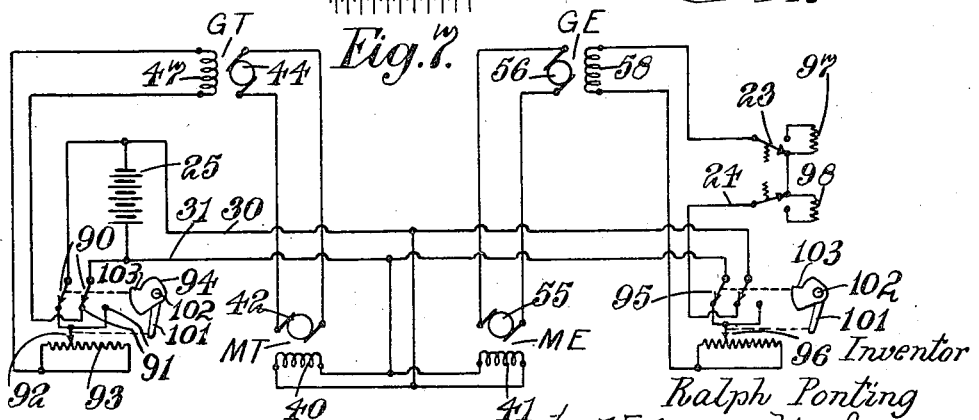

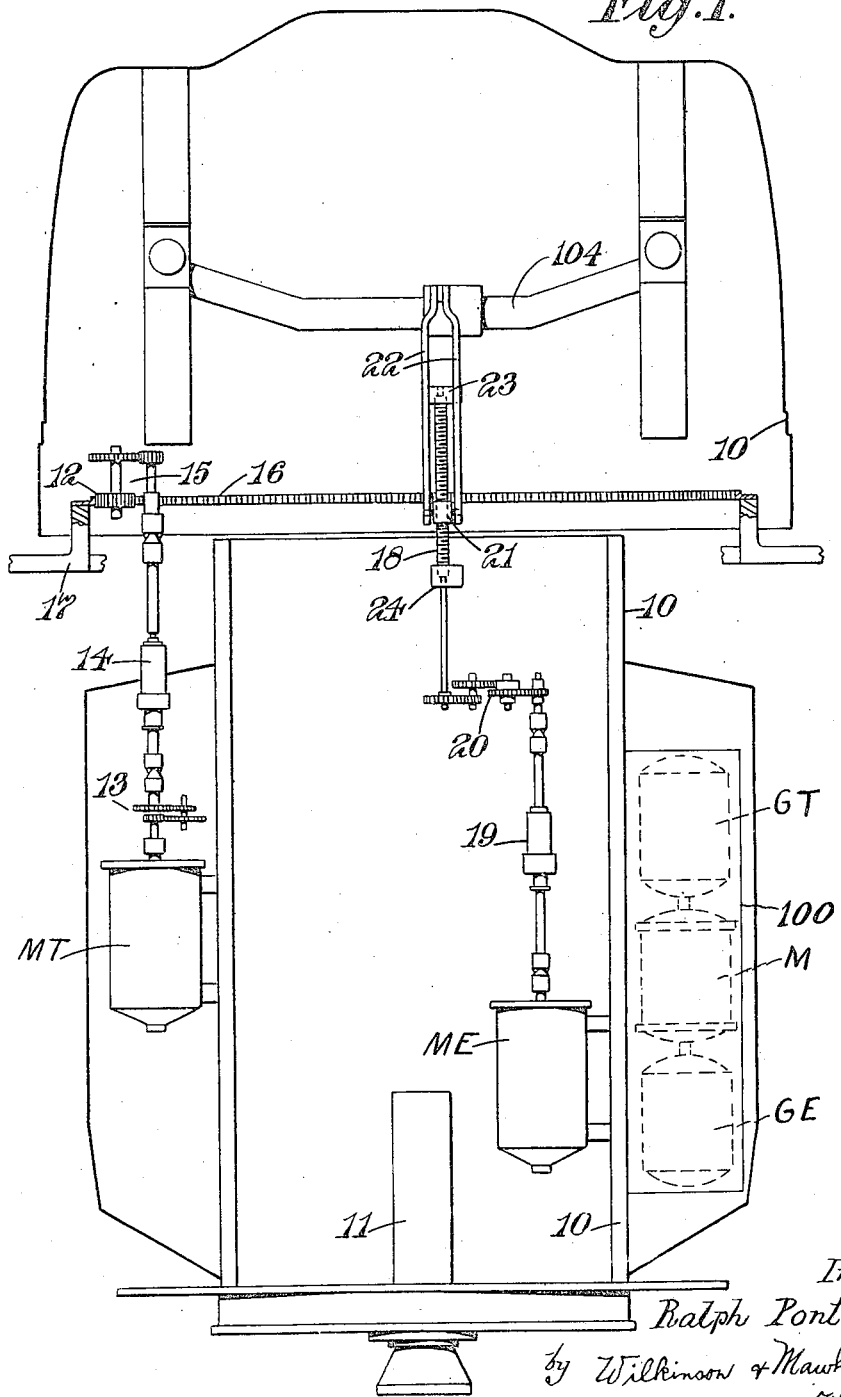

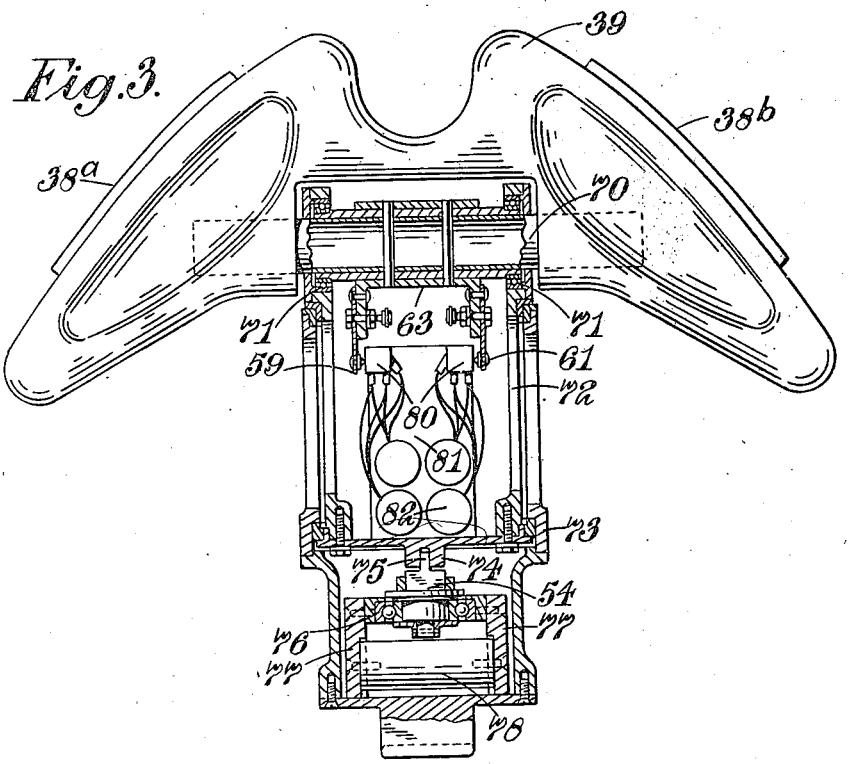
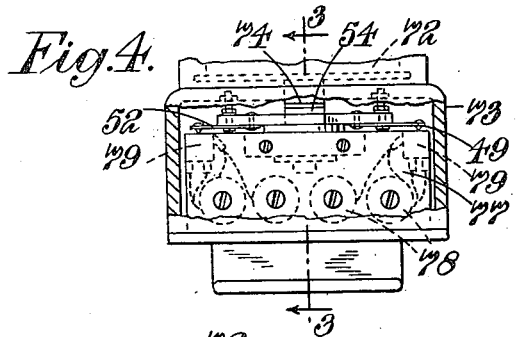
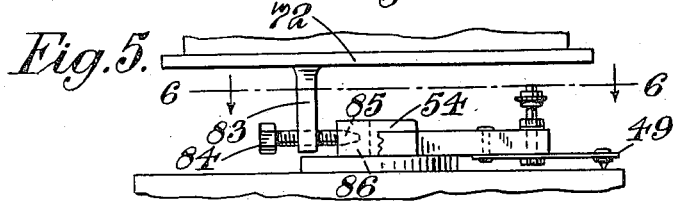
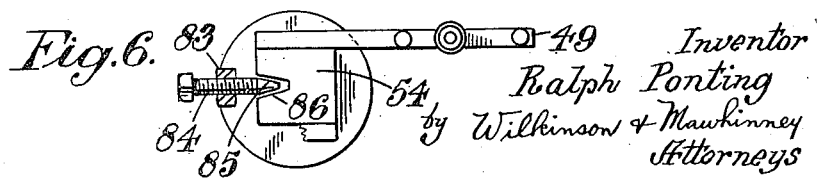

Patented Mar. 15, 1949

2,464,654

UNITED STATES PATENT OFFICE 2,464,654

CONTROLLING APPARATUS FOR POSITIONING GUNS

Ralph Ponting, Bristol, England, assignor to The Bristol Aeroplane Company Limited, Bristol, England, a company of Great Britain Application March 20, 1943, Serial No. 479,947
In Great Britain November 13, 1941

Section 1, Public Law 690, August 8, 1946.
Patent expires November 13, 1961

3 Claims. (Cl. 89—37.5)

This invention relates to controlling apparatus for guns and has for its object to provide an improved mechanism for effecting the training and elevating movements of a gun, and is particularly suitable for use on aircraft.

According to this invention, operating mechanism for effecting the training and/or elevating movements of a gun comprises separate electric motors for each movement, a separate generator for each motor and means for controlling the direction and speed of each motor by controlling the field-current of its generator.

As used on aircraft, a gun is usually mounted in a turret and the training movements are effected by rotation of the turret and gun, and according to this invention, the electric motor for the training movements operates on the turret.

In one arrangement according to this invention, the ends of a shunt field-winding of each generator are connected respectively to the movable contacts of a pair of potentiometers which are connected in parallel across a source of electric power, and the said contacts are movable together along their potentiometers to vary their potentials simultaneously in opposite senses.

In another arrangement according to this invention a shunt field-winding of each generator is connected in a separate circuit which includes a switch for reversing its polarity and a rheostat so arranged that movement of its contact from a mid-position in either direction increases the current through the circuit, and means interconnecting the switch and rheostat contact such that the switch is operated to reverse the polarity of the circuit whenever the contact is moved through its mid-position.

The invention also includes the provision of limit switches to prevent damage to the motors when the gun reaches the limit of either its elevating or training movement.

Two arrangements in accordance with this invention will now be described, by way of example only, with reference to the accompanying drawings in which:

Figure 1 shows, diagrammatically and in elevation, operating mechanism for a gun and gun-turret in an aircraft;

Figure 2 is a circuit diagram for the controlling mechanism shown in Figure 1;

Figure 3 is a vertical section, on the line 3—3 of Figure 4, through a controlling potentiometer unit employed in the circuits of Figure 2;

Figure 4 is an elevation, with part of the casing broken away, of the lower part of the controlling unit as seen from the left of Figure 3;

Figures 5 and 6 are an elevation and a section on the line 6—6 of Figure 5 respectively, of a modification that may be incorporated in the controlling unit of Figures 3 and 4, Figure 7 is a circuit diagram for a second arrangement of the operating mechanism, and Figure 8 is a diagram showing the arrangement of a potentiometer used in the circuit of Figure 2.

Like references indicate like parts in all the Figures of the drawings.

As shown in Figure 1, a gun-turret 10 is supported by a suitable bearing 11 to rotate in an aircraft (not shown). A gun (not shown) is mounted on a gun mounting 104 which is pivoted in the turret to rock about a horizontal axis so that the gun can be elevated or depressed. The gun is trained by rotating the turret. The training and elevating movements are effected by two motors MT and ME which are mounted on the turret. The motor MT rotates the turret to train the gun and drives a gear wheel 12 through a reduction gearing 13, a torque-limiting clutch 14 and a second reduction gearing 15. The wheel 12 meshes with an internal gear ring 16 which is secured to a part of the aircraft structure shown diagrammatically at 17. Since the gear ring 16 cannot rotate, the motor, when energised, will rotate the turret. The motor ME elevates the gun and drives a screw-threaded shaft 18 through a torque-limiting clutch 19 and a reduction gearing 20. A nut 21 is carried by the shaft 18 and is connected by links 22 to the gun so that rotation of the shaft 18 by the motor ME raises or lowers the nut 21 and depresses or elevates the gun. The nut 21 is arranged to open a normally closed limit-switch 23 when it reaches the top of the shaft 18 and to open similar limit-switch when it reaches the bottom of the shaft 18. These switches serve, as explained in detail later, to stop the motor ME when the gun is fully elevated or fully depressed. In the arrangement shown, the turret can rotate through 360° so that similar limit-switches are not required to control the motor MT. If the maximum rotation is to be less than 360°, limit-switches should also be provided to stop the motor MT when it reaches either of its extreme positions.

The clutches 14 and 19 may be either friction-clutches or dog-clutches with V-shaped teeth so that they can slip in either direction and are spring-loaded to transmit the maximum torque required to rotate the turret and elevate or depress the gun respectively. Should this torque be exceeded, owing to the turret or gun jamming or the gun reaching its fully elevated or depressed position, the appropriate clutch will slip. It is preferred to employ dog-clutches since audible warning of either clutch slipping is given by its teeth clicking over one another.

As shown in Figure 2, the main electric supply of the aircraft is connected through lines 26 and 27 and slip-rings 28 and 29 to a main line 30 and a main switch 32 in the turret. Closure of the main switch 32 connects the armature 33 and field winding 34 of a motor M across the power supply 25 so that the motor is energised and drives two generators GT and GE to which it is mechanically coupled to form a motor-generator set mounted in the turret. The two generators GT and GE are arranged on opposite sides of the motor M with their shafts in line with and coupled to the motor shaft to form a unit which is supported within a tubular casing 100 (Figure 1) secured in the turret. This permits of the motor-generator set being withdrawn from the casing as a unit and replaced by another set should a fault occur in it. The main switch 32 also connects the slip-ring 29 to a control switch 36 which, when closed, connects a line 31 in circuit. The control circuits are energised from the lines 30 and 31 and the motors MT and ME can only be energised if this line is alive through the closure of both switches 32 and 36. As shown in the drawings, the switch 36 is opened and closed manually while the switch 32 is constituted by contacts, opened by a spring and closed by a relay coil 32a which is energised when contacts 37a and 37b are closed. The contacts 37a and 37b are opened by a spring and closed on the principle of the "dead man's handle" each by a respective part 38a and 38b (Figure 3) carried by a hand-grip 39 by which the training and elevation of the gun are controlled. Either or both of the contacts 37a and 37b and, therefore, the contacts 32 are closed so long as the hand-grip is being gripped. Alternatively, the coil 32a and contacts 37a and 37b may be omitted and the switch 32 operated manually. The switch 36 is then replaced by a pair of contacts in parallel and operated respectively by the parts 38a and 38b (Figure 3).

When the line 31 is alive, the field windings 40 and 41 of the motors MT and ME will be energised. The armature 42 of the motor MT is connected in a closed circuit with that of the generator GT. The circuit extends from the armature 42 through a line 43, the armature 44 of the generator GT, the series field-winding 45 of that generator and line 46 back to the armature 42. The armature 42 is thus energised by the generator GT and the speed and direction of rotation of the motor MT will depend on the magnitude and polarity of the current delivered by the generator GT. The output of this generator is controlled by varying the magnitude and polarity of the current through the externally excited field-winding 47 of the generator GT in the following manner:

One end of the winding 47 is connected by a line 48 to a contact 49 movable along a potentiometer resistance 50. The other end of the winding is connected through a line 51 and resistance R2 to a contact 52 movable over a potentiometer resistance 53. The resistances 50 and 53 are connected in parallel in a circuit extending from the line 31 through a resistance R1, and a resistance R3 to the line 30. The contacts 49 and 52 are carried by a rotary member 54 so that, by turning this member, the contact 49 can be moved towards one end of the resistance 50 and the contact 52 towards the opposite end of the resistance 53.

The operation is as follows: In the position shown with the member 54 in its mid-position, the contacts 49 and 52 are at the same potential which corresponds to half the potential drop across the resistances 50 and 53. There will be no current flowing through the field-winding 47 of the generator GT and its output will be zero. The armature 42 of the motor MT will not be energised and the motor will not rotate the turret. If the member 54 is turned in either direction, the potential of one of the contacts 49 and 52 will be increased and that of the other reduced to an equal extent. There will then be a potential difference between the contacts and a current corresponding in magnitude to this potential difference will flow through the field-winding 47 of the generator GT. The polarity of this current will depend on which contact is the more positive and therefore on the direction in which the member 54 was turned from its mid-position. The output of the generator energises the motor which rotates the turret one way or the other depending on the polarity of the current delivered by the generator to the motor armature and at a speed depending on the magnitude of the current. As the member 54 is turned further from its mid-position, the potential difference between the contacts 49 and 52, the current through the field-winding and the output of the generator GT are increased so that the speed of the motor and the speed at which the turret is rotated will also increase.

The control of the direction and speed of rotation of the elevating motor GE is similar. Thus the armature 55 of this motor is connected in a closed circuit with the armature 56 and series field-winding 57 of the generator GE and the externally excited winding 58 of the generator is connected directly to a contact 59 adjustable along a potentiometer resistance 60 and through a resistance R5 to a contact 61 adjustable along a potentiometer resistance 62. The contacts are carried by a rotary member 63 and the speed and direction of the motor ME depends on the direction and extent of the movement of the member 63 from its mid-position. The resistances 60 and 62 are connected to the line 30 through the resistance R4 but the connection to the line 31 is different in that the resistance 60 is connected to the line 31 through the limit-switch 24 and the resistance R6 while the connection from the resistance 62 includes the limit-switch 23. Both these switches are closed normally and the operation is then as previously described. The operation of the limit-switches is as follows:

Assume that the member 63 is rotated clockwise from its mid-position and that the motor ME is raising the nut 21 (Figure 1). The externally excited winding of the generator GE is energised over a circuit from the line 31 through the resistance R6, the switch 23, the right-hand part of the resistance 62, the contact 61, the resistance R5, the winding 58, the contact 59, the left-hand part of the resistance 60 and the resistance R4 to the line 30. When the nut 21 reaches its upper limit, the switch 23 is opened and breaks this circuit so that the normal field-winding circuit for the generator GE is broken and the motor ME stops. A circuit still exists through the switch 24 and the resistance 60 and the winding 58 is connected through the contacts 59 and 61 in parallel with the left-hand part of the resistance 60, the parallel branch extending from the contact 59 through the winding 58, the contact 61 and the left-hand part of the resistance 62. The polarity of the potential across the winding 58 is the opposite to that existing while the switch 23 was closed so that the output of the generator GE tends to drive the motor ME in the opposite direction to lower the nut 21. The magnitude of the current through the winding 58, and, therefore, the output of the generator GE, varies with the position of the member 63 being zero when this member is in its extreme clockwise position and increasing slowly as the member is moved anti-clockwise from this position to its mid-position and then more rapidly as the member is moved beyond its mid-position. The constants of the circuits are so selected that the output of the generator GE will be insufficient to rotate the motor against the resistance of the parts connected to it until the member 63 has been moved to its mid-position or beyond that position. The effect of the contacts 24 opening is similar.

It will be seen that the motor ME comes to rest when it has elevated, or depressed, the gun to its extreme position but that the circuits for reversing its movement are intact so that the motor can be brought into action to move the gun away from whichever extreme position it occupies. Similar limit-switches may be provided between the resistance R1 and the potentiometers 50 and 53 if the turret is only capable of rotating through less than 360°.

The members 54 and 63 are adjusted by the hand-grip 39 shown in Figure 3. This handgrip is secured on a shaft 70 which is rotatable in bearing 71 carried by a frame 72 which is rotatable about a vertical axis in a fixed casing 73. The frame is formed with a slotted boss 74 which is engaged with lug 75 projecting from the member 54 so that the member 54 rotates with the frame. The member 54 is supported by a bearing 76 which, in turn, is carried by two plates 77 fixed in the casing 73. The contacts 49 and 52 are supported by the member 54 and extend in opposite directions to engage segmental commutators 79 carried by the plates 77 and these plates also support resistance bobbins 78 which are connected between adjacent segments in the commutators to form the resistances 50 and 53.

The member 63 is secured on the shaft 70 and carries the contacts 59 and 61 which engage segmental commutators 80 carried by two plates 81 (one only being shown) secured in the rotatable frame 72. The plates 81 also carry resistance bobbins 82 which are connected to the segments of the commutators 80 to form the resistances 60 and 62.

It will be apparent that rotation of the turret is controlled by turning the hand-grip 39 about a vertical axis and elevation of the gun by rocking the hand-grip about a horizontal axis so that the gunner has complete control over the training and elevation of the gun by means of the single hand-grip 39.

Figures 5 and 6 show a modification of the connection between the frame 72 and the member 54 which allows of the back-lash between these parts being adjusted to suit the individual requirement of the gunner. The frame 72 carries a depending lug 83 into which a set-screw 84 is screwed so that its conical end 85 enters a V-shaped slot 86 in the member 54. The backlash can be reduced by screwing the set-screw towards the member 54 and increased by screwing it in the opposite direction.

It will be seen that the type of potentiometer employed results in the potential difference between the contacts 49 and 52 or 59 and 61 being varied in steps as the contacts move from one segment to the next of the commutators 79 or 80, with intermediate values for the potential difference when the contacts bridge pairs of segments. Each commutator has an odd number of segments and the resistances connected between the centre segment and each adjacent segment are each made large, for example, one sixth of the total resistance. Thus with twenty-five segments in the commutator and a source of potential of 24 volts, suitable value for the two centre resistances would be 24 ohms as shown in Figure 8 (in which suitable values for the resistances are indicated) as compared with an average of 4.55 ohms for the remaining resistances and a total of 143 for the complete potentiometer. This ensures that the potential difference between the brushes 49 and 52 or 59 and 61 produced when the brushes are moved from the centre segment to the next segment on either side will be sufficient to cause the motor MT or ME to rotate at its minimum speed and thus ensures that the control of the motors is positive and the idle position of the control is definite. It also ensures correct operation of the elevating control when either of the limit-switches 23 and 24 is opened. The values of the remaining resistances may be selected to give any desired characteristic to the control. For example they may be selected so that each step of adjustment of the member 54 or 63 produces the same change in the speed of the motor MT or ME or they may be selected to give a closer control of the speed at low speed than at high speed. The spacing of the commutator segments may also vary to give a suitable characteristic.

The characteristics of the control system can also be varied by adjusting the resistances R1 to R6, although these resistances are optional. The generators GT and GE are compound wound and should be level-compounded or slightly overcompounded but it is found that the operation of the mechanism is adversely affected if the generators are too much over-compounded. The degree of compounding of the generators can be adjusted by adjustable resistances 87 and 88 connected in parallel with their series field-windings 45 and 57 respectively.

In the modified arrangement of which the circuits are shown in Figure 7, the motors MT and ME are mounted in the turret to operate the turret and gun as shown in Figure 1. The generators GE and GT are driven by a motor (not shown) as in Figure 2 or in other suitable manner. The armatures 42 and 55 of the train and elevating motors are connected as before in series with the armatures 44 and 56 respectively of the generators. The lines 30 and 31 are energised from a source 25 of electric power and the field windings 40 and 41 of the motors are energised from the lines 30 and 31.

The potentiometer control of the field-windings 47 and 56 of the generators described with reference to Figure 2 is replaced by a switch and rheostat control. The lines 30 and 31 are connected separately to two blades 90 of a reversing switch having three contacts 91. The centre contact is connected to one end of the winding 47 while the two outer contacts are connected together and to a contact 92 movable along a rheostat 93, the ends of which are connected together and to the other end of the winding 47. In the position shown, there is a circuit from the line 31 through the right-hand blade 90, the centre contact 91, the winding 47, the rheostat 93, the rheostat contact 92, the left-hand switch contact 91 and the left-hand blade 90 to the line 30. The magnitude of the current flowing over this circuit can be increased by moving the rheostat contact further to the left and reduced by moving that contact to the right, the current being a minimum when the contact 92 is midway along the rheostat 93. The rheostat contact 92 is shown diagrammatically as being connected to and adjusted by an arm 101 which is pivoted at 102 and is secured to a cam 94 which actuates the switch blades 90 in such manner that they occupy the position shown so long as the contact 92 is to the left of its mid-position. A ball 103 on the cam 94 disengages the blades 90 from all three contacts 91 to open the field-winding circuit when the contact 92 is in its mid-position and then engages the blades 90 with the centre and right-hand contacts 91 when the contact 92 is to the right of its mid-position. Thus the field-winding circuit is broken when the contact 92 is in its mid-position but is re-established with its polarity reversed when the contact 92 is moved to the right of its mid-position. The further the contact 92 is moved from its mid-position, the greater is the current through the field-winding 47.

The circuit for the field-winding 58 of the generator GE is controlled by a similar switch 95 and rheostat 96 but the circuit includes the limit-switches 23 and 24 in series. When the nut 21 (Figure 1) reaches one or other extreme position, it shifts the switch 23 or the switch 24 to its opposite position to that shown so as to include either a resistance 97 or a resistance 98 in the circuit to the winding 58. This reduces the output of the generator GE and thus the torque delivered by the motor ME to such an extent that the motor can be stalled without damaging it when further movement of the gun is prevented by one of two stops (not shown) that limit its elevating movement. On reversal of the current through the field-winding 58, the output of the generator GE will still be reduced but will be sufficient to move the gun away from its extreme position. As soon as the nut 21 has moved clear of the switch 23 or 24, the switch is reversed by a spring so as to restore the circuit through the field-winding of the generator GE to normal and allow the generator to deliver its full output.

The first arrangement as described with reference to Figure 2 is preferred for the following reasons. The use of a motor generator in the turret reduces the number of leads to the turret to two and thus simplifies the wiring. The potentiometer control of the output of the generators GT and GE gives a smoother control on reversal for the training and elevation of the gun. The limit-switch arrangement in Figure 2 preserves the reversing circuit intact and ensures in a simple manner that the gun can always be moved away from either extreme position of elevation.

I claim:

1. In combination, a turret, a mounting in which the turret is rotatable, an electric training motor mounted on the turret, gearing between the motor and the mounting by which the motor rotates the turret in the mounting, a gun mounting pivoted in the turret, an electric elevating motor mounted in the turret and connected to the gun mounting to rock said mounting for elevating and depressing a gun in said turret, two electric generators having separately-excited field-windings which generators are mounted in the turret and are electrically connected to the two motors respectively to energize them independently, a third motor mounted on the turret and mechanically coupled to both generators to drive them, manually operable means in the turret for controlling the polarity and strength of the field-current in the field winding of each generator independently, and means for adjusting each generator directly connected to said manually operable means.

2. The combination according to claim 1 comprising a support on which the two generators and the said third motor are mounted as a unit, said support being detachably mounted in the turret.

3. Operating mechanism for effecting the training and elevating movements of a gun comprising a nut and screw gearing as a part of the elevating mechanism of the gun, normally closed limit switches associated with the screw to be automatically opened when the screw ends reach the limit switches, a training motor for the gun, an elevating motor for the gun, a training generator in circuit with said training motor and having an externally excited field winding, an adjustable potentiometer in circuit with said externally excited field winding, an elevating generator in circuit with said elevating motor and having an externally excited field winding, an adjustable elevating potentiometer in circuit with said separately excited field winding of said elevating generator, said limit switches being in circuit with said elevating potentiometer between said potentiometer and said externally excited field winding of said elevating generator.

RALPH PONTING.

REFERENCES CITED

The following references are of record in the file of this patent:

UNITED STATES PATENTS

| Number | Name | Date |
|---|---|---|
| 499,530 | Fletcher | June 13, 1893 |
| 710,045 | Day | Sept. 30, 1902 |
| 798,335 | Hall | Aug. 29, 1905 |
| 1,003,927 | Leonard | Sept. 19, 1911 |
| 1,193,917 | Nye | Aug. 8, 1916 |
| Re. 16,667 | Hewlett et al | July 5, 1927 |
| 1,776,716 | Beekman | Sept. 23, 1930 |
| 1,818,106 | Stevens | Aug. 11, 1931 |
| 1,988,458 | Minorsky | Jan. 22, 1935 |
| 2,061,983 | Rossman | Nov. 24, 1936 |
| 2,107,803 | Rolcik | Feb. 8, 1938 |
| 2,110,142 | Wilkinson | Mar. 8, 1938 |
| 2,175,820 | Baston | Oct. 10, 1939 |
| 2,247,842 | Kamenarovic | July 1, 1941 |
| 2,336,052 | Anderson et al | Dec. 7, 1943 |
| 2,356,152 | Edwards et al | Aug. 22, 1944 |
| 2,370,585 | Scott et al | Feb. 27, 1945 |

FOREIGN PATENTS

| Number | Country | Date |
|---|---|---|
| 168,090 | Great Britain | Aug. 30, 1921 |
| 422,009 | Great Britain | Jan. 3, 1935 |
| 436,071 | Great Britain | June 4, 1935 |
| 504,536 | Great Britain | Apr. 26, 1939 |
| 673,342 | France | Oct. 7, 1929 |
| 694,487 | France | Sept. 16, 1930 |